United States Patent [19]

Uno

[11] 4,085,418
[45] * Apr. 18, 1978

[54] COLOR IMAGE PICK-UP SYSTEM USING STRIP FILTER

[76] Inventor: Yoshihiro Uno, c/o Matsushito Research Institute, Inc., No. 1006, Oaza Kadoma, Kadoma City, Osaka, Japan

[*] Notice: The portion of the term of this patent subsequent to Jan. 27, 1993, has been disclaimed.

[21] Appl. No.: 624,930

[22] Filed: Nov. 22, 1975

Related U.S. Application Data

[60] Division of Ser. No. 450,850, Mar. 13, 1974, Pat. No. 3,935,588, Continuation of Ser. No. 245,085, Apr. 18, 1972, abandoned.

[30] Foreign Application Priority Data

Apr. 20, 1971 Japan .................................. 46-25883
Apr. 20, 1971 Japan .................................. 46-25884
Apr. 20, 1971 Japan .................................. 46-25885

[51] Int. Cl.² ............................................ H04N 9/07
[52] U.S. Cl. ........................................................ 358/44
[58] Field of Search ...................................... 358/44–46

[56] References Cited

U.S. PATENT DOCUMENTS

| | | | |
|---|---|---|---|
| 2,721,228 | 10/1955 | James et al. | 358/44 |
| 2,755,334 | 1/1956 | Banning | 358/44 |
| 2,924,648 | 2/1960 | Luther | 358/16 |
| 3,001,012 | 9/1961 | Braicks | 358/45 |
| 3,407,265 | 10/1968 | Krause | 358/45 |
| 3,548,092 | 12/1970 | Takagi | 358/45 |
| 3,935,588 | 1/1976 | Uno | 358/44 |

Primary Examiner—John C. Martin

[57] ABSTRACT

A color filter strip arrangement for a color television camera tube which produces luminance and chrominance signals, and in which the chrominance signals are separated from each other by phase division. A biasing light source is provided for illuminating the color filter to provide a minimum light level against a black frame at the periphery of the filter in order to enable discrimination of chrominance components when the scene being televised is at an extremely low light level. In another embodiment the strip arrangement involves combinations of first and second colors, and has a strip of the first color, a strip of the second color and a black strip. These combinations of strips are, in turn, separated by transparent strips.

6 Claims, 37 Drawing Figures

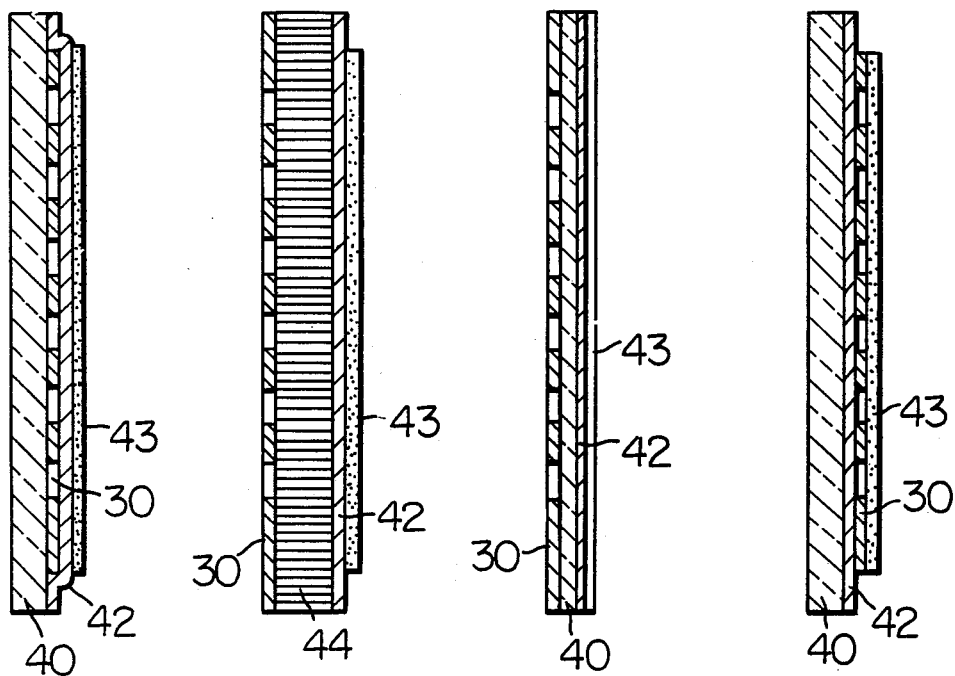
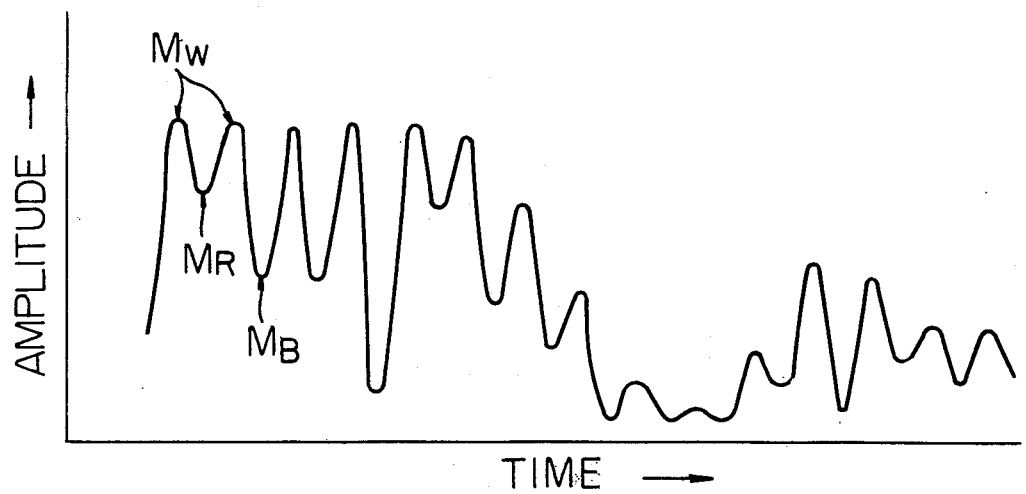

($\frac{1}{16}$)fs ($\frac{1}{8}$)fs ($\frac{3}{16}$)fs ($\frac{1}{4}$)fs ($\frac{5}{16}$)fs

FREQUENCY ⟶

COLOR IMAGE PICK-UP SYSTEM USING STRIP FILTER

This is a division, of application Ser. No. 450,850, Filed Mar. 13, 1974, now Pat. No. 3,935,588, which is a Continuation of application Serial No. 245,085, filed April 18, 1972, abandoned.

The present invention relates to color image pick-up systems and more particularly to a color image pick-up system using a camera tube incorporated with a color strip filter.

Several color image pick-up systems of the type employing a camera tube combined with a color strip filter have been developed, which are advantageous in their simple and compact constructions. One of such color image pick-up systems utilizes a color strip filter constituted by red, blue and green color strips which is respectively arranged in predetermined pitches in space frequency. The color strip filter is placed in close proximity of the faceplate of a camera tube so as to spatially modulate an optical image focused thereon by an optical arrangement in red, blue and green contents. The image spatially modulated is converted by the camera tube into an electric image signal containing three components respectively having different fundamental frequencies corresponding to the primary three color contents. The color signals are separated from one another by filters respectively having central frequencies substantially equal to the three fundamental frequencies of the components contained in the image signal. The separated components are then converted through a known process into a composite color video signal including components, e.g., Y, Q and I components. Difficulty has been encountered in fabricating such color strip filter including red, blue and green strips since the strips should be arranged in three different space frequencies.

Another system utilizes another type of color strip filter which includes index strips in addition to the red, blue and green color strips. The color strip filter is incorporated with a camera tube in a similar manner as the above-stated system so as to obtain an image signal. This image signal includes an index signal caused by the index strip and three color signals. The index signal is utilized for separating the color signals from one another. It is pointed out that the width of each strip of the strip filter should be so narrow as to make difficult the fabrication of the strip filter since four strips correspond a single picture element. It is also pointed out that, in the systems as stated above, merely a third or fourth amount of light emitted from the optical image focuses on the strip filter is utilized for making the luminance signal which mainly governs the resolution power of a video image reproduced by an image reproducing device such as TV receiver.

It is accordingly an object of the present invention to provide a color image pick-up system which can produce a composite color video signal which contains a luminance signal with a sufficiently large intensity.

It is another object to provide a color image pick-up system which operates with high fidelity.

It is a further object to provide a color image pick-up system which can produce a luminance signal with an intensity in dependence on intensities of color components of an optical image to be picked up.

It is a still further object to provide a color image pick-up system which produces a color signals of uniform intensity.

It is a still further object to provide a color image pick-up system which has a simple construction.

It is a still further object to provide an image pick-up system using a novel color strip filter which can be readily fabricated.

Other objects, advantages and novel features of the invention will become apparent from the following detailed description of the invention when considered in conjunction with the accompanying drawings in which:

FIG. 4A, 4B, 4C and 4D are cross-sectional views showing various types of target assemblies useful for the present invention;

FIG. 6 is a graph showing a partial waveform of an output image signal produced upon impingement of the electron beam upon the target of the camera tube of FIG. 5;

Corresponding parts are similarly numbered.

Briefly described, an image pick-up system according to the invention comprises an image signal generator including a single camera tube incorporated with a color strip filter, and a signal processor for converting an image signal produced by the signal generator into a composite video signal of a known type. This color strip filter is constituted by a plurality of white or transparent strips alternating with two kinds of color strips, for example, red and blue strips. The image signal therefore includes a luminance component caused by the transparent strips and two color signals caused by the color strips. In the signal processor, the luminance and two color signals are separated from each other through phase-detection and then the separated two color signals are separated from each other through either phast-detection or frequency detection.

Figure 1A:
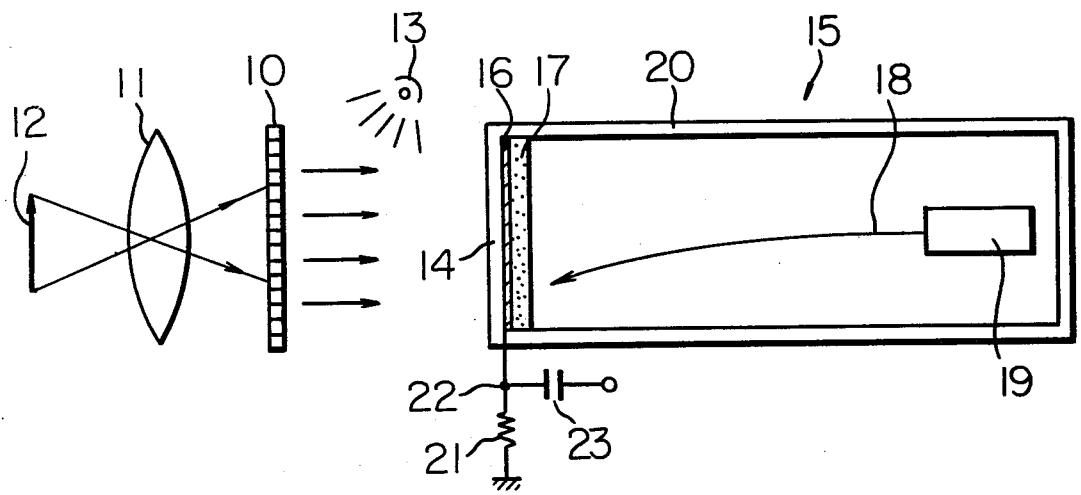
FIG. 1A is a sectional view showing a conventional color image pick-up system.
Figure 1B:
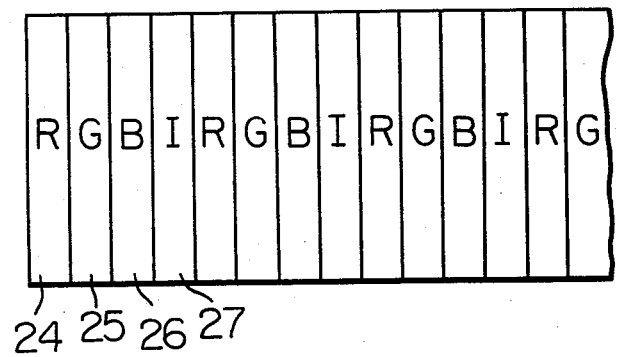
FIG. 1B is an enlarged fragmentary view of a color strip filter used in the system of FIG. 1.

Referring now to the drawings and more specifically to FIG. 1A, there is shown a typical conventional color image pick-up system which comprises a color strip filter 10, an object lens 11 for focusing an object 12 onto the surface of the color strip filter 10 so that an optical image of the object 12 is formed on the surface of the strip filter 10 as shown in FIG. 1B. The strip filter 10 includes index strips 27 and red, green and blue strips 24, 25 and 26 which are arranged in cyclic succession so that the optical image is spatially modulated when passing through the strip filter 10. The index strips are, for example, made of a fluorescent material and excited by illumination from a light source 13 positioned in the vicinity of the strip filter 10. The spatially modulated optical image is irradiated onto the faceplate 14 of a vidicon 15 which have a target assembly including a transparent electric conductive layer 16 disposed on the back surface of the faceplate 14 and a photo-conductive layer 17. The photo-conductive layer 17 is scanned by an electron beam 18 emitted from an electron gun 19 positioned within an envelope 20 of the vidicon 15. Since the spatially modulated optical image is irradiated on the photo-conductive layer 17, electric charges are stored in dependence on the conductivity of a point the electron beam 18 strikes. The electric charges flow through a resistor 21 to the ground thereby to generate a voltage signal at a circuit junction 22. The voltage signal is picked-up through a coupling capacitor 23 by a suitable signal processing means.

In FIG. 1B, the color strip filter 10 used in the system in FIG. 1A is illustrated in an enlarged scale, in which the red, green and blue colored strips and the index strips are designated by 24, 25, 26 and 27, respectively.

Figure 2:
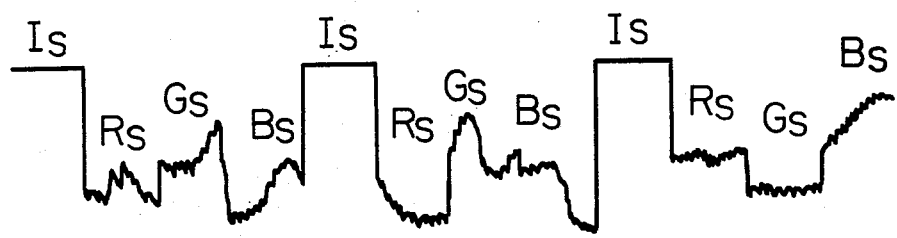
FIG. 2 is a diagram showing a waveform of an output signal from the system of FIG. 1.

In FIG. 2, a waveform of the image signals produced by the vidicon in FIG. 1A is shown, which includes index signal $I_s$, red, green and blue color signals $R_s$, $G_s$ and $B_s$.

Figure 3:
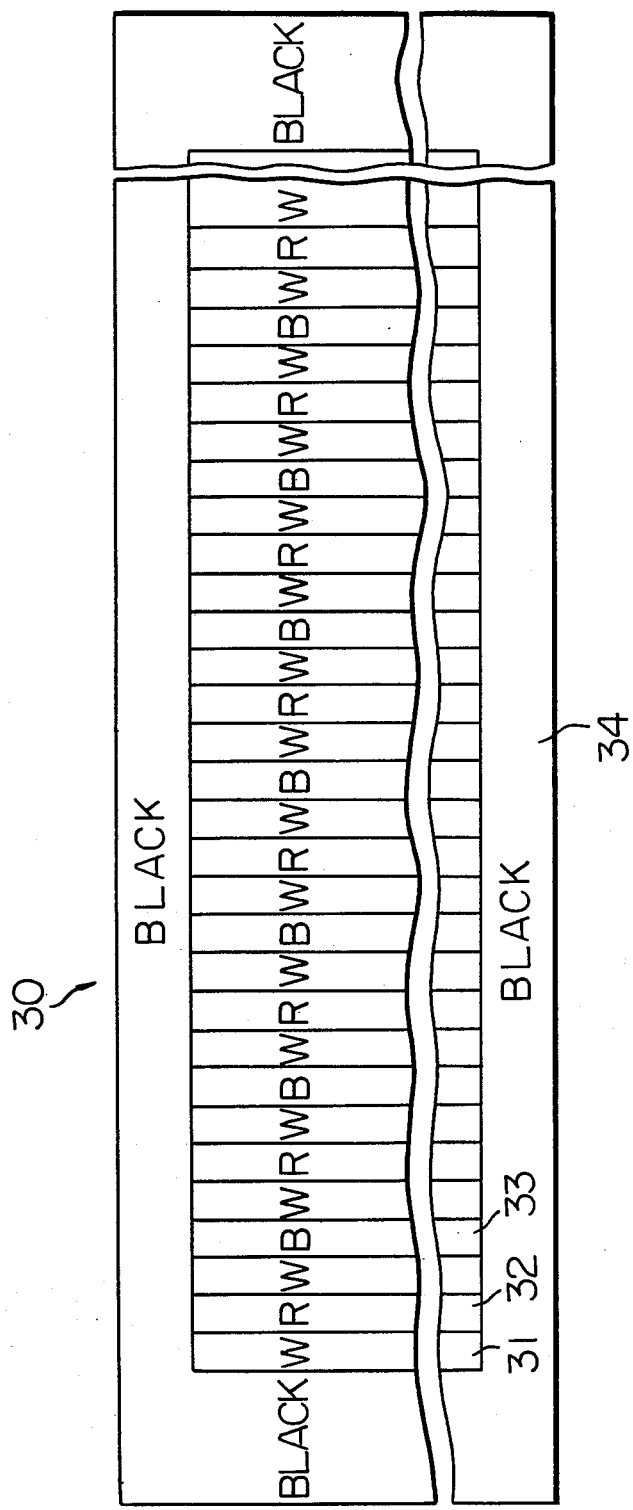
FIG. 3 is an enlarged fragmentary view of a color strip filter according to the invention.

In FIG. 3, a first embodiment of color strip filter 30 used in a system according to the invention is illustrated which includes transparent or white strips 31 and red and blue strips 32 and 33. The white strips 31 and the color strips 32 or 33 are arranged alternately with one another in a direction perpendicular to the longitudinal direction of each strip. Although the strips 31, 32 and 33 may respectively have various widths, the strips preferably have a common width from half to double as much as the diameter of the flying spot to scan an optical image passed through the strip filter. When, for example, the effective horizontal scanning width and the diameter of the flying spot are 12.7mm and 20 microns, respectively, it is desirable the width of each strip is 20 microns. The strips 31, 32 and 33 arranged in such order as mentioned above are preferably surrounded by a black frame 34. In this instance, it is to be noted that the space frequency of the color strips 32 or 33 is, for example, ¼ to ⅛ times as small as that of the transparent strips 31, so that, an image signal spatially modulated by the color strip filter 30 includes a luminance component with a high intensity and frequency and chrominance components with low intensity and frequencies. It is, on the other hand, revealed in physiology that the human eyes are more sensitive to the luminance component than to the chrominance components. Therefore, an image signal produced by using the strip filter of the invention can be converted into a favorable video signal through a suitable signal processor.

The above-mentioned strip filter 30 may be built in various types of target assemblies several of which are exemplified in FIGS. 4A through 4D.

In FIG. 4A, the color strip filter 30 is disposed on a transparent substrate 40 made of, for example, glass and having a thickness of about 2 to 3mm when the substrate 40 forms a faceplate of a camera tube. A transparent electric conductive layer 42 made of a metal oxide such as $SnO_2$ and $InO_2$ is disposed on the color strip filter 30. A photo-conductive layer 43 is formed on the electric conductive layer 42.

In FIG. 4B, another type of target assembly is shown which comprises the strip filter 30 disposed on one surface of a fiber optics plate 44. A transparent electric conductive layer 42 is disposed on the other surface of the fiber optics plate 44. A photo-conductive layer 43 is further disposed on the electric conductive layer 42.

In FIG. 4C, another type of target assembly is shown which includes the color strip filter 30 disposed on one surface of a glass plate 40. A transparent electric conductive layer 42 is disposed on the other surface of the glass plate 40. A photo-conductive layer 43 is further disposed on the layer 42.

In FIG. 4D, another type of target assembly is shown which includes the color strip filter 30 made of, in this case, electric conductive material. The photo-conductive layer 43 is disposed on one surface of the filter 30. A transparent electric conductive layer 42 is disposed on the other surface of the filter 30. The conductive layer 42 is disposed on the glass plate 40.

Figure 5:
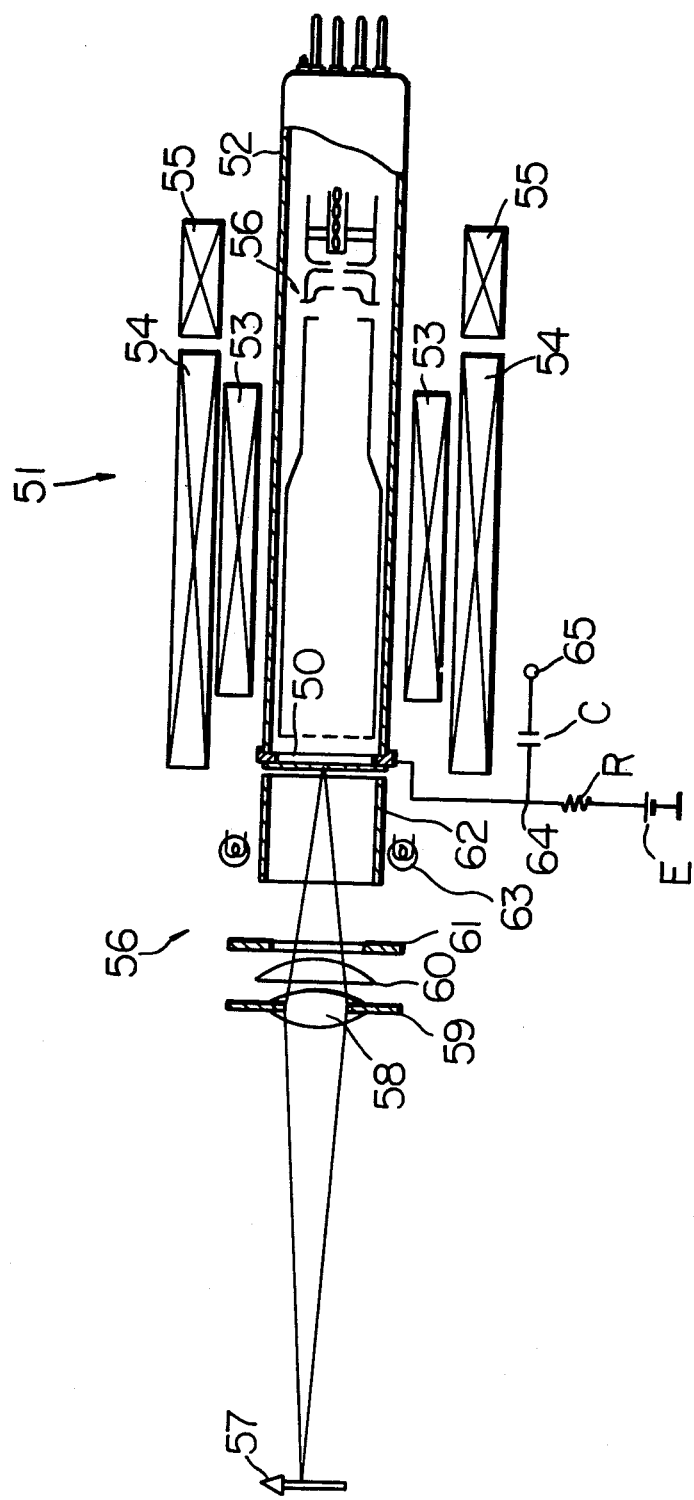
FIG. 5 is a cross-sectional view of an image signal generator of a system according to the invention.

In FIG. 5, an image signal generator according to the invention, is illustrated which includes a target assembly 50 with the strip filter shown in FIGS. 3 and 4A to 4D. The target assembly 50 is placed on a faceplate of a camera tube 51 such as vidicon with an envelope 52 surrounded by vertical and horizontal deflection coils 53 and 54 and an alignment coil 55. An electron gun assembly 56 is positioned in the envelope 52, which emits an electron beam toward the target assembly 50. The thus emitted electron beam is vertically and horizontally deflected so as to scan the back surface of the target assembly 50. The target assembly includes an electric conductive layer which is connected through a resistor R to a positive terminal of a d-c power source E whereby the electron beam is accelerated toward the targer 50. A negative terminal of the power source E is grounded. An optical arrangement 56 is placed in front of the faceplate of the vidicon 51 so as to focus an object or image 57 onto the faceplate of the vidicon 51. The optical arrangement 56 includes an object glass or lens 58 with a diaphragm 59, and a semicircular cylindrical lens 60 interposed between the lens 58 and the faceplate of the vidicon 51. The optical arrangement 56 may further includes an annular reflector 61 interposed between the lens 60 and the faceplate, a tubular shielding member 62 interposed between the reflector 61 and the faceplate, and one or more bias light sources 63 placed adjacent to the peripheral wall of the shielding member 62. The reflector 61, shielding member 62 and bias light source 63 may be omitted, if desired. With this arrangement, light rays radiated from the bias light sources 63 are reflected on the reflector 61 and illuminate the faceplate of the vidicon 51 so that an optical image focused by the lenses 59 and 60 on the faceplate is applied with a certain brightness. The optical image is converted by the scanning of the electron beam emitted from the electron gun 56 into an electric image signal which appears at a junction 64 and picked up through a coupling capacitor C and an output terminal 65 by a suitable signal processor.

FIG. 6 is a graphic illustration of a waveform of the image signal produced by the image signal generator of FIG. 5, in which the abscissa and ordinate axes respectively represent the time and amplitude. It is apparent that the waveform has maximum values $M_W$ which periodically appear and minimum values $M_R$ and $M_B$ interposed between the maximum values $M_W$. The maximum values $M_W$, and minimum values $M_R$ and $M_B$ respectively correspond with the white, red and blue strips of the strip filter.

Figure 7:
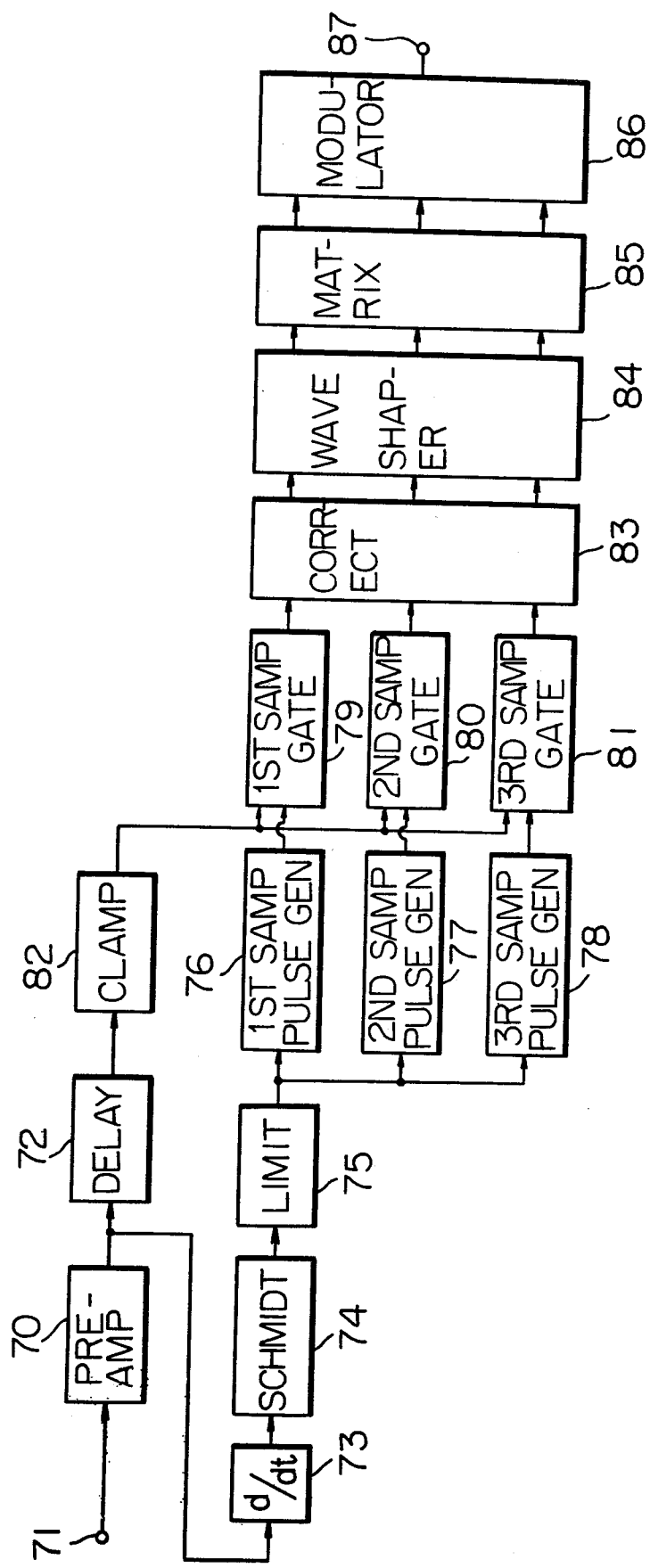
FIG. 7 is a block diagram of a signal processor with a biasing light source to be used with the television camera tube.

In FIG. 7, a signal processor for converting the image signal produced by the image signal generator of FIG. 5 into a composite video signal is illustrated, which comprises a pre-amplifier 70 having an input terminal connected to an input terminal 71. The input terminal 71 is to be connected to the output terminal 65 of the generator of FIG. 5 so that the image signal as shown in FIG. 6 is applied to the pre-amplifier 70. An output terminal of the pre-amplifier 70 is connected to input terminals of a delaying circuit 72 and a differentiator 73. An output terminal of the differentiator 73 is connected to an input terminal of a Schmidt trigger circuit 74 which has an output terminal connected to input terminals of a limiter 75. The limiter 75 further wave-shapes the output signal from the Schmidt circuit 74 into a pulse having sharp leading and trailing edges. The limiter 75 may be omitted, if desired. An output terminal of the limiter 75 is connected to input terminals of first, second and third sampling pulse generators 76, 77 and 78 which respectively produce sampling pulse trains in response to pulses applied thereto. Output terminals of the sampling pulse generators 76, 77 and 78 are connected to input terminals of first, second and third sampling gates 79, 80 and 81, respectively. An output terminal of the delaying circuit 72 is connected to an input of a clamping circuit 82 having an output terminal connected to the other input terminals of the first, second and third sampling gates 79, 80 and 81. The clamping circuit clamps on an input signal applied thereto to a d-c level. Output terminals of the sampling gates 79, 80 and 81 are connected to input terminals of a correction circuit 83 which has output terminals connected to input terminals of a wave shaper 84. Output terminals of the wave shaper are connected to a matrix circuit 85 which has output terminals connected to input terminals of a modulator 86. An output terminal of the modulator 86 is connected to an output terminal 87.

Referring now to FIGS. 8A to 8F, the operation of the signal processor of FIG. 7 is explained hereinbelow.

Figure 8A:
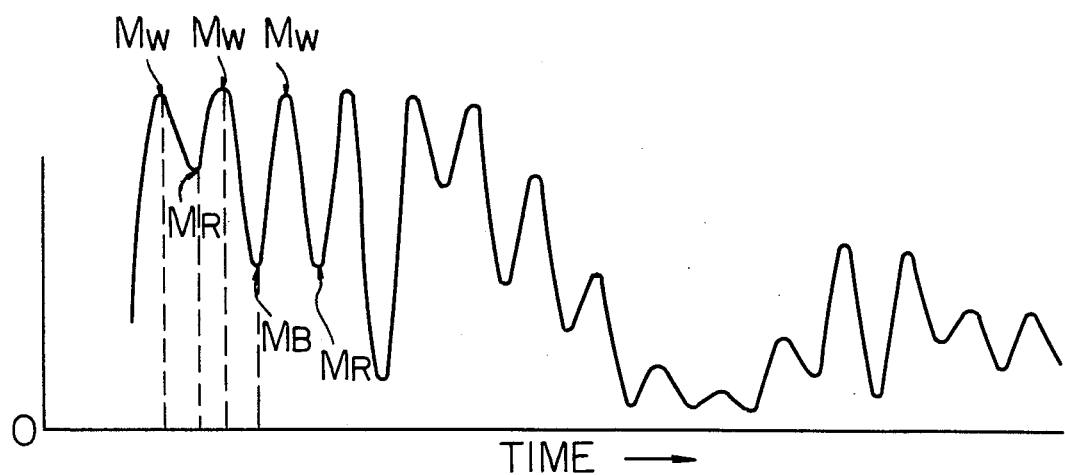
FIGS. 8A through 8F are views showing various waveforms appearing in the signal processor of FIG. 7.
Figure 8B:
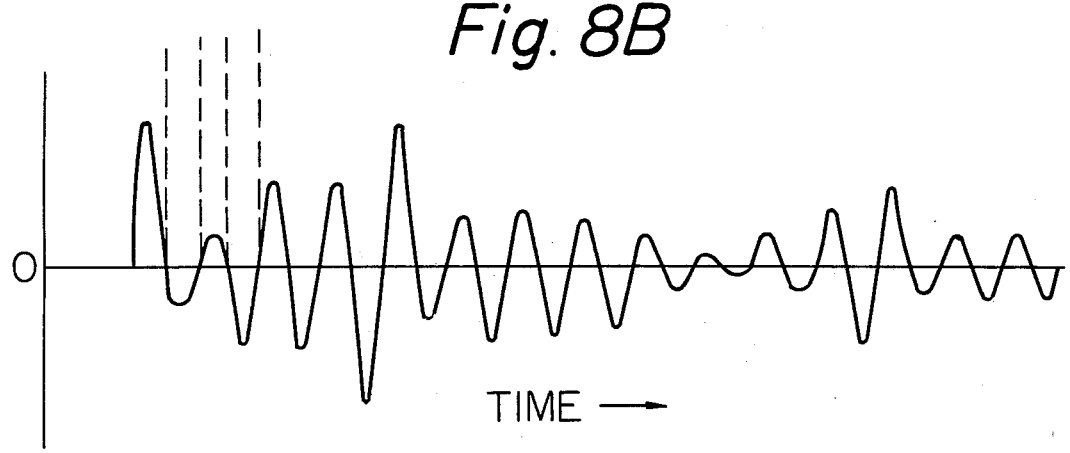
Figure 8C:
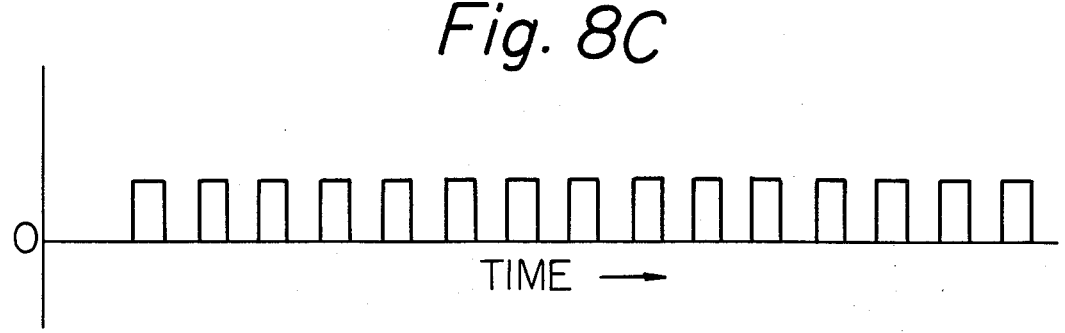
Figure 8D:
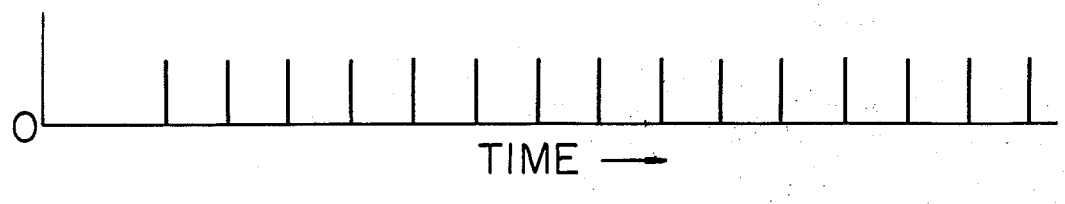
Figure 8E:
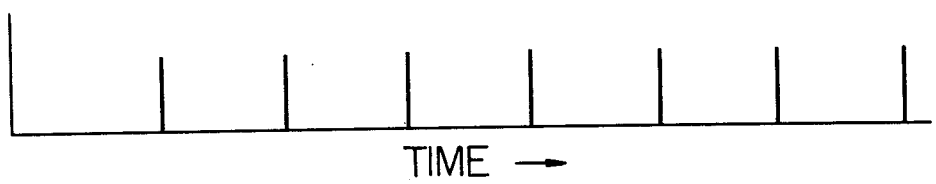
Figure 8F:
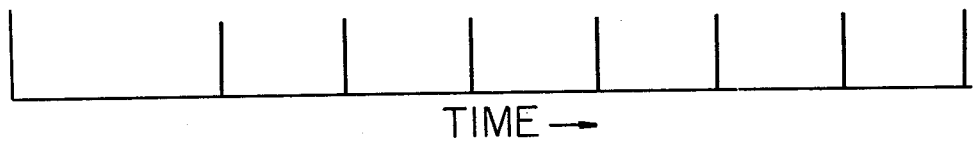

When the image signal shown in FIG. 6 is applied to the input terminal 71, a signal analogous to the image signal appears on the output terminal of the pre-amplifier 70, which is applied to the delaying circuit 72 and the differentiator 73. In FIG. 8B, a wave form of the differentiated signal from the differentiator 73 is shown which changes its polarity from positive to negative when the image signal takes a maximum $M_W$ and, on the contrary, from negative to positive when the image signal takes a minimum $M_R$ or $M_B$. The signal shown in FIG. 8B is applied through the Schmidt trigger circuit 74 to the limiter 75 which then produces a pulse signal as shown in FIG. 8C. The output signal of the limiter 75 is applied to the first sampling pulse generator 76 which then produces first sampling pulses each pulse of which appears at the trailing edges of the pulse signal from the limiter 75. The output signal of the limiter 75 is further applied to the second and third sampling pulse generators 77 and 78 which then respectively produces second and third sampling pulses alternating with one another and appearing at leading edges of alternate pulses of the pulse signal from the limiter 75, as shown in FIGS. 8E and 8F.

The output signal of the pre-amplifier 70 is, on the other hand, applied to the delaying circuit 72 which delays the signal by a delay time equal to a total delay time of the differentiator 73, Schmidt trigger circuit 74, limiter 75 and the sampling pulse generators 76, 77 and 78. The delayed signal from the delaying circuit 72 is delivered to the clamp circuit 82 which superposes on the delayed signal a d-c bias voltage predetermined on the basis of the magnitude of the image signal corresponding to the black frame of the color strip filter of FIG. 3. The delayed and biased signal is applied to the first, second and third sampling gates 79, 80 and 81 which sample the signal with the first, second and third sampling signals, respectively. The sampled signals from the sampling gates 79, 80 and 81 undergo the correction by the correcting circuit 83 for removing the distortion in the image signal caused by the responsiveness of the camera tube in the system of FIG. 5. The sampled and corrected signals are applied to the wave shaper 84 which wave-shapes the signals into analogue signals which are envelopes of the corresponding sampled signals, respectively. The wave-shaped signals are delivered to the matrix circuit 85 which then converts the wave-shaped signals into the known luminance (Y), the color (Q, I) signals. The Y, Q and I signals are then applied to the modulator 86 which then modulates the Q and I signals and mixes the modulated Q and I signals with the Y signal. The mixed signal or a composite color video signal appears at the output terminal 87.

Figure 9:
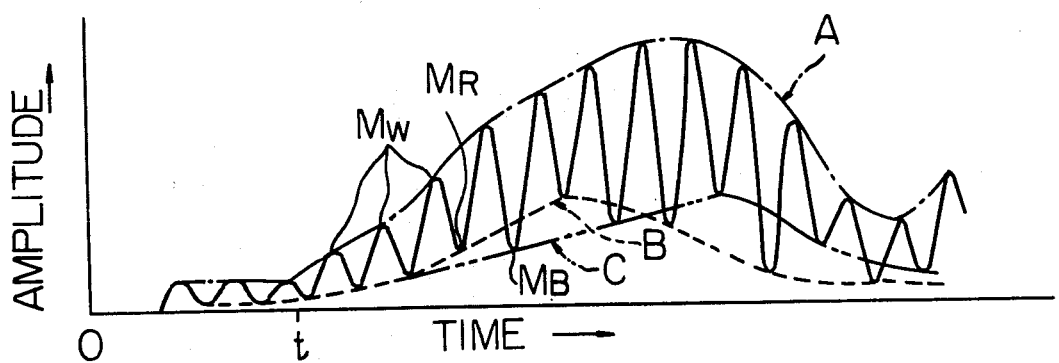
FIG. 9 is an explanatory view for the operation of the system shown in FIGS. 5 and 7.

FIG. 9 illustrates another example of the image signal produced in the generator of FIG. 5 through one horizontal scanning of the electron beam on the faceplate of the vidicon 51. Since, in this case, a dark scene is focused on a portion of the faceplate corresponding to a time interval till a time $t$, the particular portion is irradiated only with the light rays from the bias light source 63, so that, the image signal has small amplitudes until the time $t$. The small amplitude of image signal is exploited by the sampling signal generators in the signal processor in order to correctly produce the sampling pulse signals. It should be noted that the sampling pulse generator is inoperable without the image signal. The luminous intensity of the bias light source 63 is selected to apply to the faceplate a bias brightness of 5 to 10% of a highest brightness in the focused scene. The bias brightness is favorable to prevent unwanted occurring fluorescence in the phosphorous layer to be used in the vidicon.

Since a light scene is focused on another portion of the faceplate, the image signal has larger amplitudes after the time $t$ as shown in the figure. When this image signal with maximum values $M_W$, and minimum values $M_R$ and $M_B$ is applied to the signal processor of FIG. 7, the wave-shaper 84 produces envelopes shown by a dot and dash line A, broken line B and phantom line C. The envelopes A, B and C are respectively luminance signal, red color signal and blue color signal.

Figure 10:
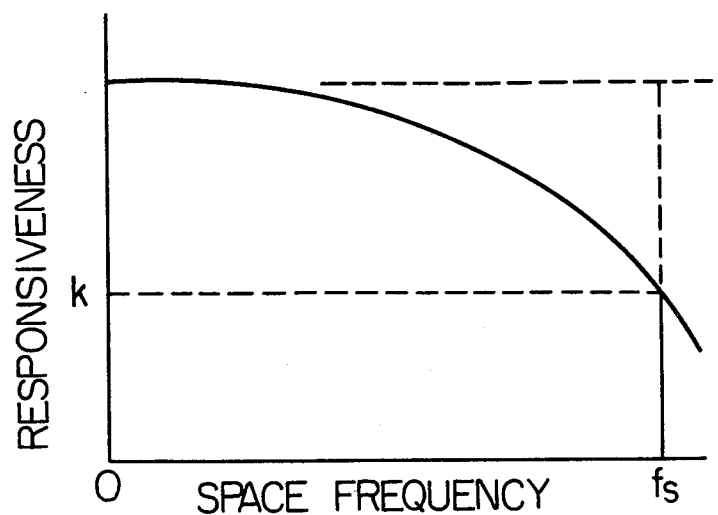
FIG. 10 is a graph showing a frequency response curve of a vidicon.
Figure 11:
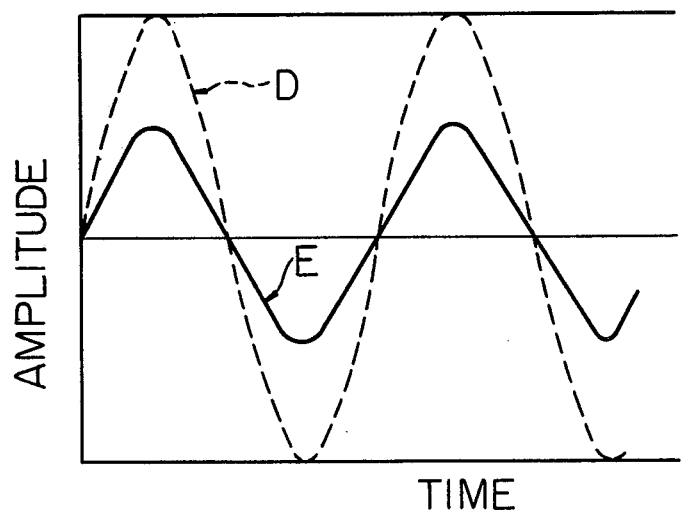
FIG. 11 is a graph explaining distortion of an output signal of the vidicon.

A typical characteristic of a usual vidicon is shown in FIG. 10, in which abscissa and ordinate axes respectively represent space frequency and responsiveness. Hence, when a light input signal having a space frequency $f_s$ as indicated by a broken curve D of FIG. 11 is irradiated on the faceplate of the vidicon, an output signal as indicated by a solid curve E is produced by the vidicon. The correction circuit 83 corrects such distortion in the output signal from the vidicon of the generator.

Figure 12:
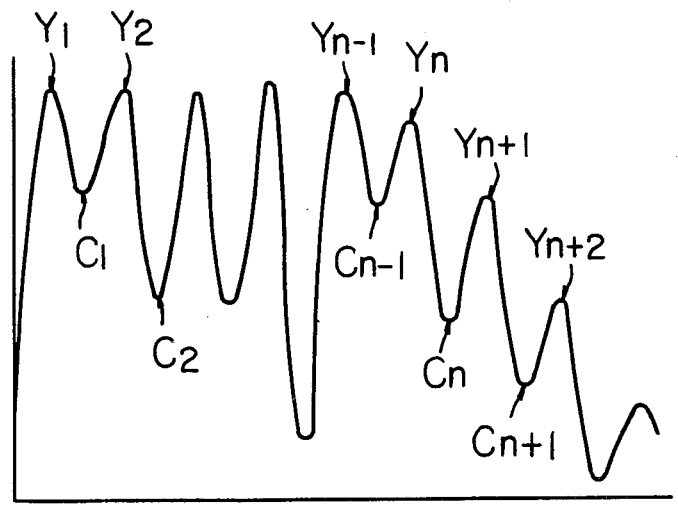
FIG. 12 is a graph illustrating luminance and chrominance signals produced upon impingement during a line scan.

In FIG. 12, waveform of the output signal from the image signal generator is shown, which includes maxima indicated by $Y_1, Y_2 \ldots Y_{n-1}, Y_n,$ and $Y_{n+1}$, and minima indicated by $C_1, C_2, \ldots C_{n-1}, C_n$ and $C_{n+1}$. The maximum and minimum values $Y_n$ and $C_n$ are corrected into values $Y_N$ and $C_N$ through the following equations:

$$Y_N = \frac{1+k}{2k} \left\{ Y_n - (\frac{1-k}{1+k})(\frac{C_{n-1}+C_n}{2}) \right\}$$

$$C_N = \frac{1+k}{2k} \left\{ C_n - (\frac{1-k}{1+k})(\frac{Y_{n-1}+Y_{n+1}}{2}) \right\}$$

where, $k$ represents the responsiveness of the vidicon at the space frequency $f_s$.

Figure 13:
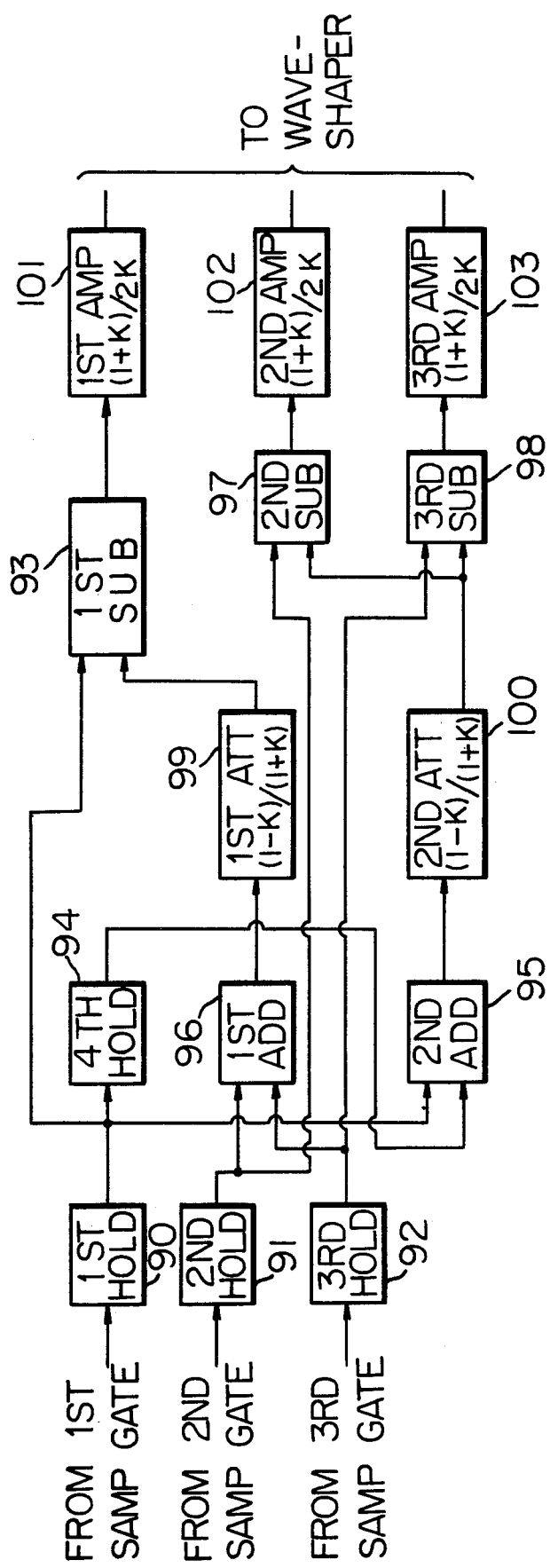
FIG. 13 is a block diagram of a correcting circuit in the signal processor of FIG. 7.

FIG. 13 shows a circuit arrangement of the correcting circuit 83 of the signal processor of FIG. 7 which corrects the sampled image signal on the basis of the above equations. The circuit arrangement includes a first, second and third holding circuits 90, 91 and 92 having input terminals connected to the first, second and third sampling gates 79, 80 and 81. An output terminal of the holding circuit 90 is connected to one input terminal of a first subtractor 93, to an input terminal of a fourth holding circuit 94 and to one input terminal of a second adder 95. An output terminal of the second holding circuit 91 is connected to one input terminal of a first adder 96 and to one input terminal of a second subtractor 97. An output terminal of the fourth holding circuit 94 is connected to the other input terminal of the second adder 95. An output terminal of the third holding circuit 92 is connected to the other input terminal of the first adder 96 and to one input terminal of a third subtractor 98. An output terminal of the first adder 96 is connected to an input terminal of a first attenuator 99 which has an output terminal connected to the other input terminal of the first subtractor 93. An output terminal of the second adder 95 is connected to an input terminal of a second attenuator 100 having an output terminal connected to the other input terminal of the third subtractor 98.

Output terminals of the first, second and third subtractor are connected to input terminals of first, second and third amplifiers 101, 102 and 103. Output terminals of the amplifiers 101, 102 and 103 are connected to the wave-shaper 84.

When, in operation, the sampled luminance and two color components $Y_n$, $C_{n-1}$ and $C_n$ are applied to the first, second and third holding circuits 90, 91 and 92 which respectively hold the sampled components applied thereto until the succeeding sampled components are applied to the holding circuits 90, 91 and 92. The sampled signals $C_{n-1}$ and $C_n$ are applied to input terminals of the first adder 96 which then produces a signal of amplitude of $(C_{n-1} + C_n)$. The $(C_{n-1} + C_n)$ signal is attenuated by a first attenuator into a signal having an amplitude of $$\frac{1-k}{1+k}(\frac{C_{n-1}+C_n}{2})$$

which is subtracted from the signal $Y_n$ at the first subtractor 93. An output signal from the first subtractor 93 is amplified by the amplifier 101 into $$\frac{1+k}{2k}\left\{ Y_n - (\frac{1-k}{1+k})(\frac{C_{n-1}+C_n}{2}) \right\}.$$

When, at the succeeding instant, the signals $Y_{n+1}$, $C_n$ and $C_{n+1}$ are applied to the holders 90, 91 and 92, the fourth holder 94 holds the signal $Y_n$. The signals $Y_{n+1}$ and $Y_n$ from the holders 90 and 94 are applied to the second adder 95 which then produces signal $(Y_n + Y_{n+1})$. The signal $(Y_n + Y_{n+1})$ is attenuated by the second attenuator 100 into a signal $$\frac{1-k}{1+k}(\frac{Y_n+Y_{n+1}}{2}).$$

The signal $$\frac{1-k}{1+k}(\frac{Y_n+Y_{n+1}}{2})$$

and the signal $C_n$ applied to the second subtractor 97 which then produces a signal of $$\left\{ C_n - \frac{1-k}{1+k}(\frac{Y_n+Y_{n+1}}{2}) \right\},$$

which signal is then amplified by the amplifier 102 into $$(\frac{1+k}{2k})\left\{ C_n - \frac{1-k}{1+k}(\frac{Y_n+Y_{n+1}}{2}) \right\}.$$

At the further succeeding instant, the amplifier produces a signal of $$(\frac{1+k}{2k})\left\{ C_{n+1} - \frac{1-k}{1+k}(\frac{Y_{n+1}+Y_{n+2}}{2}) \right\}.$$

Figure 14:
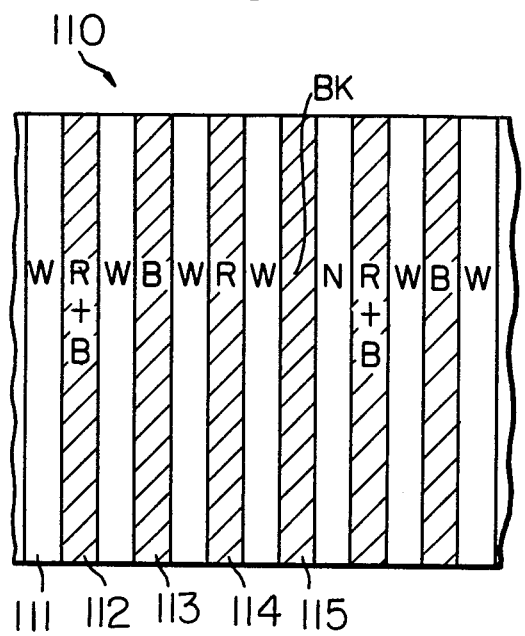
FIG. 14 is a second embodiment of the strip filter element.

FIG. 14 illustrates a color strip filter 110 of a second embodiment of the invention. This color strip filter 110 includes transparent or white strips 111, color strips alternate with the transparent or white strips. The color strips are red and blue, or magenta, blue, red and black or opaque strips 112, 113, 114 and 115 which are arranged in the order named.

Figure 15:
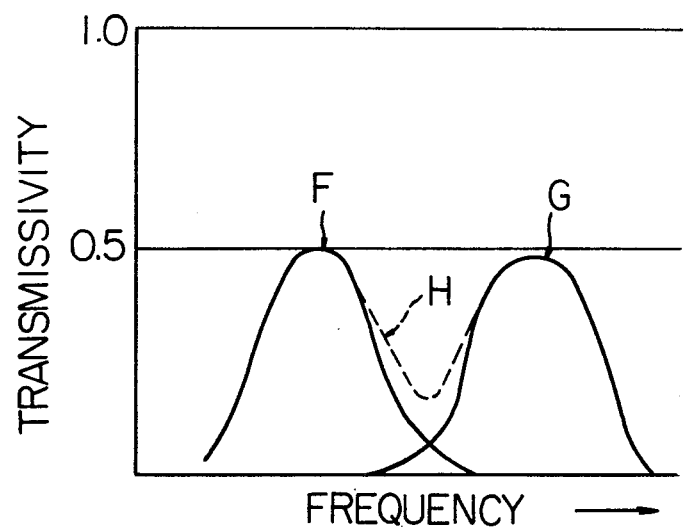
FIG. 15 is a graph showing transmisivities of strips of the strip filter of FIG. 14.

FIG. 15 illustrates transmissivities of the color strips of the filter shown in FIG. 14, wherein the abscissa and ordinate axes respectively represent the frequency and the transmissivity. Solid curves F and G respectively represent the transmissivities of the blue color and red color strips, and a broken curve H represents the transmissivity of the red and blue color strips.

Figure 16A:
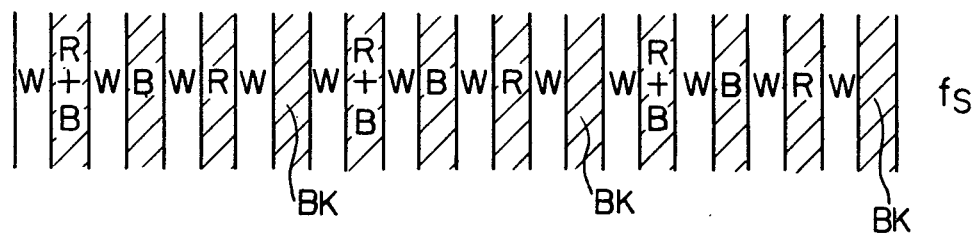
FIGS. 16A through 16D are diagrams showing output signals with respect to positions of the strips when the filter of FIG. 14 is incorporated with the image signal generator of FIG. 5.
Figure 16B:
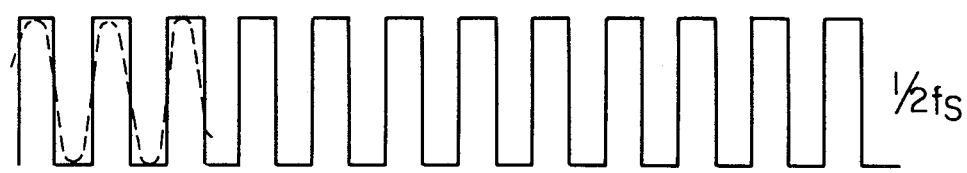
Figure 16C:
Figure 16D:

FIG. 16A diagrammatically shows the strip filter of FIG. 14, and FIGS. 16B and 16D show waveforms of a monochrome content, and red and blue color contents in an image signal produced by the generator of FIG. 5 when the strip filter of FIG. 14 is used in the target assembly of the generator of FIG. 5 and a white scene is focused on the faceplate of the vidicon. When, in this instance, a space frequency of the strip filter is assumed to be $f_s$, the monochrome or luminance signal has a fundamental wave with a frequency of $(\frac{1}{2})f_s$ and the red and blue color signals have fundamental waves with frequencies $(\frac{1}{4})f_s$ and $(\frac{1}{4})f_s$ as indicated by broken lines.

Figure 17:
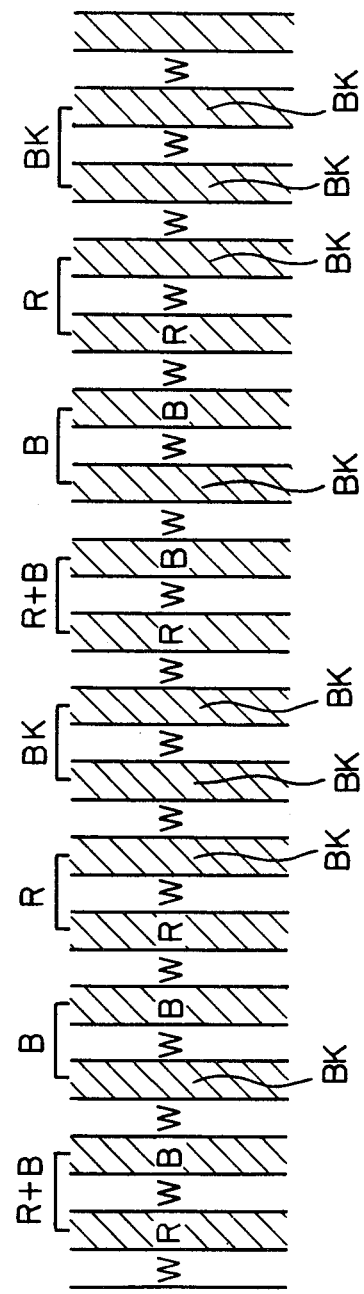
FIG. 17 is a diagram showing still another strip filter according to the invention.

The strip filter of FIG. 14 may be substituted for a strip filter shown in FIG. 17, in which a pair of neighboring color strips correspond with each color strips of the filter of FIG. 14. Even if the strip filter of FIG. 17 is used in the image signal generator, the generator functions in the same manner as the strip filter of FIG. 14 is used.

Figure 18:
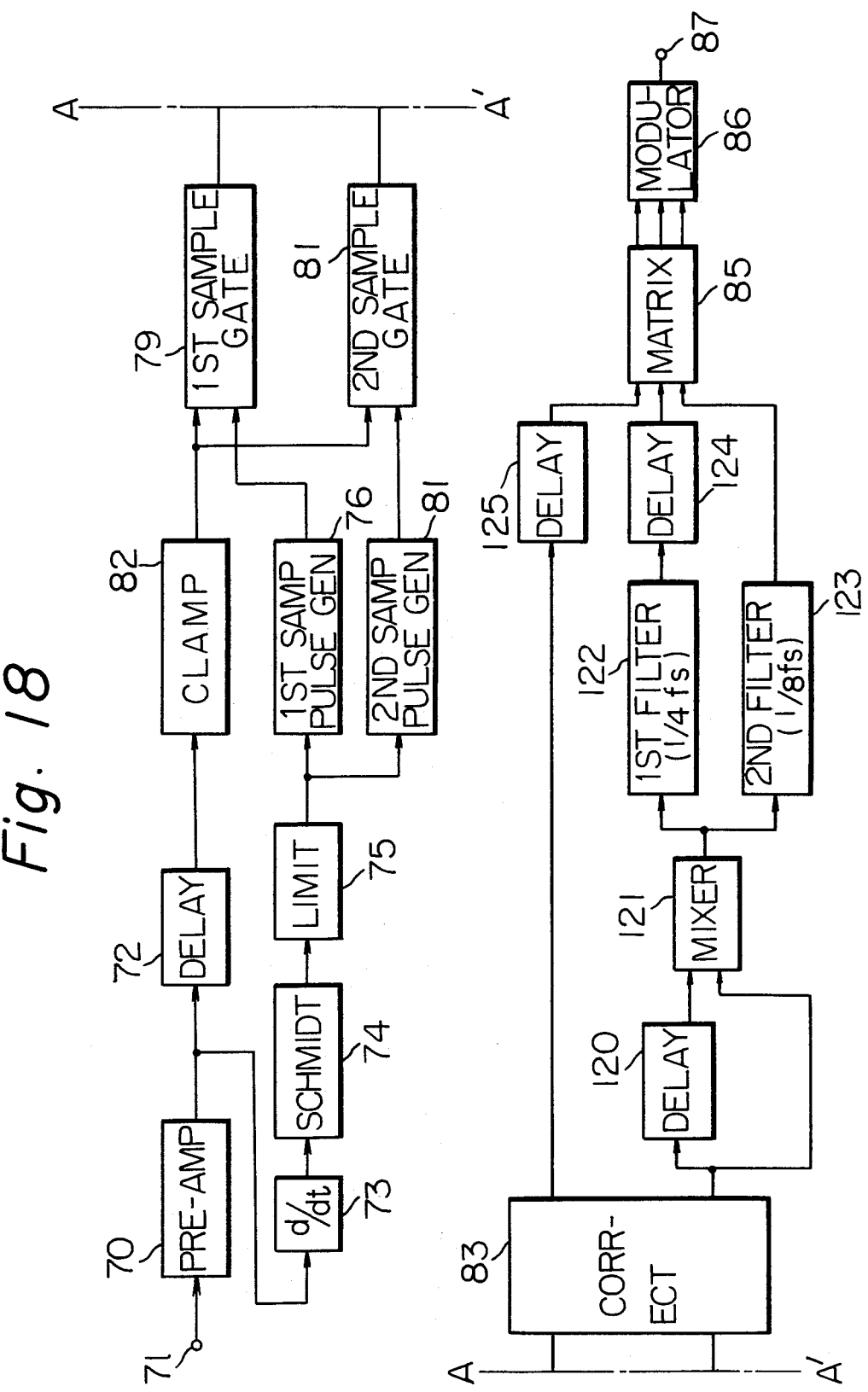
FIG. 18 is a block diagram of a signal processor to be used with the image signal generator when the strip filter of FIG. 14 is employed.
Figure 20A:
FIGS. 20A through 20E are graphs showing various waveforms produced upon impingement of the electron beam upon the color filter strip of the second embodiment.
Figure 20B:
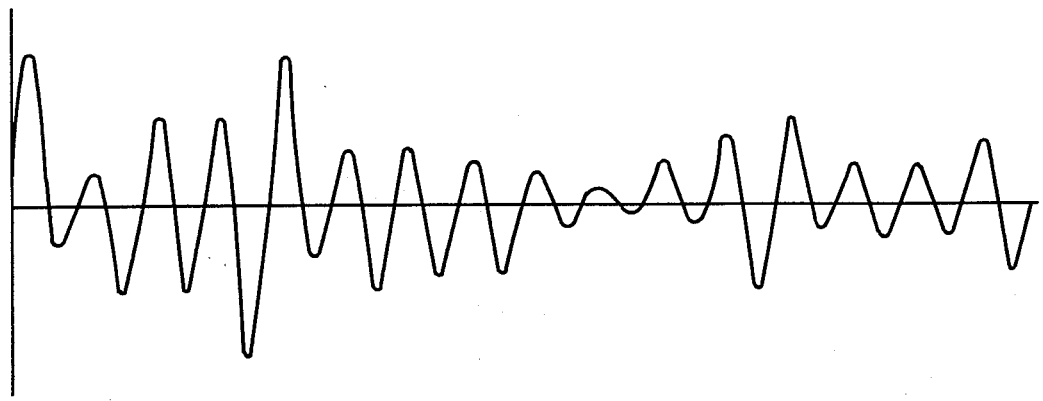
Figure 20C:
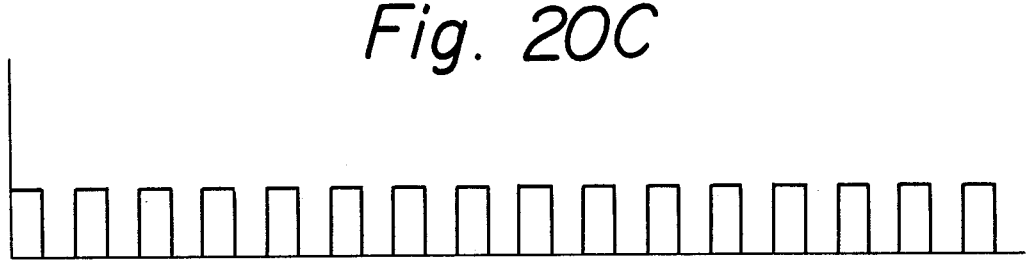
Figure 20D:
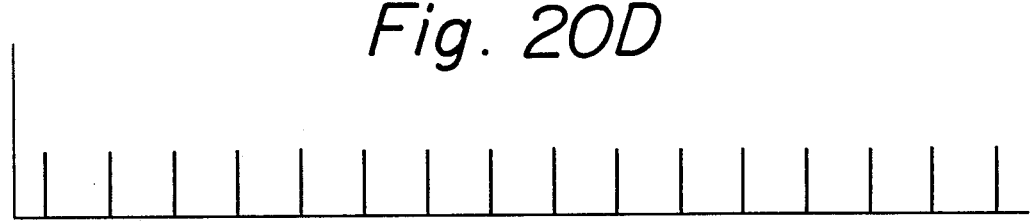
Figure 20E:
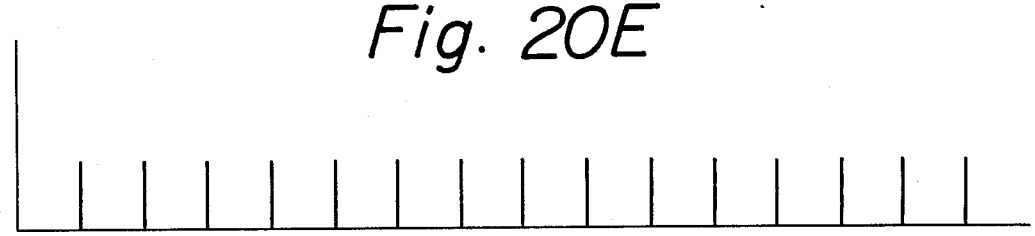

FIG. 18 illustrates a signal processor which is to be combined with generator of FIG. 5 in which the strip filter shown in either FIG. 14 or FIG. 17 is used. The processor includes a pre-amplifier 70 to which an image signal with maximum values $M_W$ and minimum values $M_C$ as shown in FIG. 20A is applied through an input terminal 71 from the generator. The image signal is amplified by the pre-amplifier 70 and then applied to a delaying circuit 72 and to a differentiator 73. The differentiator 73 produces a signal shown in FIG. 20B which changes its polarity from positive to negative at a time when the image signal takes maximum value $M_W$ and from negative to positive at a time when the image signal takes a minimum value $M_C$. The output signal from the differentiator 73 is converted by a Schmidt circuit 74 and a limiter into a pulse signal as shown in FIG. 20C. The limiter 75 may be omitted, if desired. The pulse signal from the limiter 75 is applied to a first and second sampling pulse generators 76 and 77. The sampling pulse generators 76 and 77 then produce first and second sampling pulses as shown in FIGS. 20D and 20E. The amplified image signal from the pre-amplifier 70 is, on the other hand, delayed by the delaying circuit and thereafter applied to a biasing circuit 82 which applies a bias voltage to the amplified and delayed image signal. The image signal thus processed is applied to first and second sampling gates 79 and 81 which sample the image signal with the first and second sampling signals. The sampled signals from the first and second sampling gates 79 and 81 are luminance and chrominance signals, which are applied to a correcting circuit 83. The corrected chrominance signal is delivered direct to one input terminal of a mixer 121 and through a delaying circuit 120 to the other input terminal of the mixer 121. The delaying circuit is adapted to delay the signal by a time equal to $8 \times 1/f_s$. The delaying circuit 120 and the mixer 121 preferably remove higher harmonic components contained in the chrominance signal. The chrominance signal is separated by first and second filters 122 and 123 having central frequencies $(\frac{1}{4})f_s$ and $(\frac{1}{4})f_s$ into red and blue color signals. The red color signal from the first filter is delayed by a delaying circuit 124 and applied to one output terminal of a matrix circuit 85. The blue color signal is applied direct to the other input terminal of the matrix circuit 85. The luminance signal is delayed by a delaying circuit 125 and applied to the remaining input terminal of the matrix circuit 85. The matrix circuit 85 produces the Y, Q and I signals which are then applied to a modulator 86. The modulator 86 produces a composite color video signal on an output terminal 87.

It is now apparent that the system of the invention is operable when the red and blue strips are replaced by one another or when the red strips are substituted for magenta strip and the blue strips for yellow strips.

Figure 19:
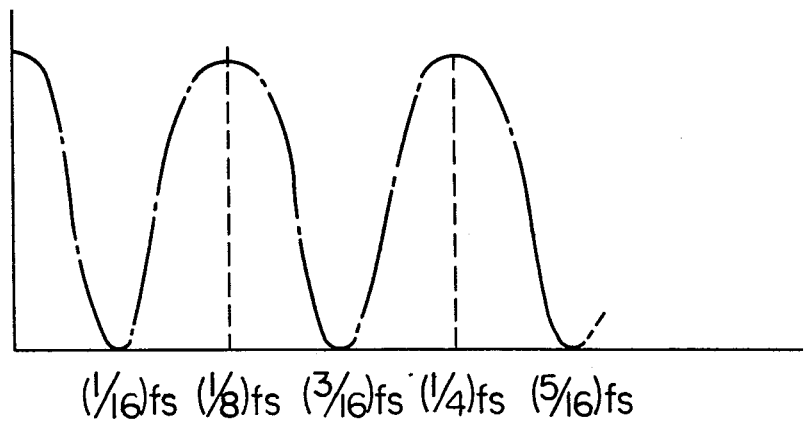
FIG. 19 is a graph showing a frequency spectrum of the chrominance signals including an infinite number of higher harmonics when mixed with its replica delayed by 8 cycles of the fundamental frequency of the power.

It is well known in the art that an a-c power including an infinite number of higher harmonics when mixed with its replica delayed by 8 cycles of the fundamental frequency $f_s$ of the power has a frequency spectrum as shown by a dot and dash line in FIG. 19.

Figure 21:
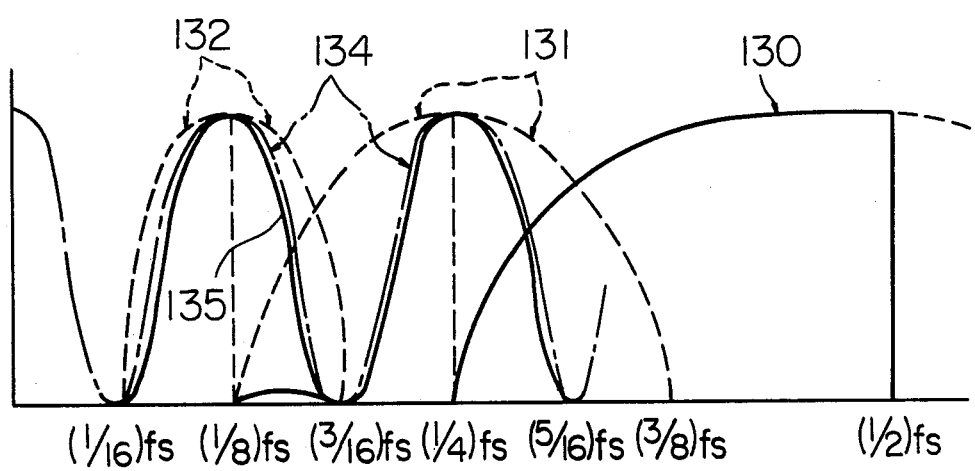
FIG. 21 is a graph explaining the filtering operation in the processing means of FIG. 18.

FIG. 21 shows frequency spectrum of the output luminance and chrominance signals of the correction circuit 83. The luminance signal has an energy distributing as shown by a solid curve 130. The red and blue color signals have energies distributing as indicated by broken lines 131 and 132. No problem resides in the overlapping of the curves 130 and 131 since the luminance and color signals are separated through phase-detection. It is, however, a problem that the curves 131 and 132 overlap one another. Since, in this instance, the color signals pass through the delaying circuit 120 and the mixer 121 which have transmission characteristics as indicated by a dot and dash line 134 and, therefore, the color signals have energizes as shown by a solid line 135, the frequency spectrums of the red and blue color signals do not overlap one another so that the color signals are completely separated from one another by the filters 122 and 123. In order to effectively achieve such separation of the color components as above-described, it is generally required that the ratio of the two space frequencies of the color components be integral and the delay time of the delaying circuit 120 is a reciprocal of twice greatest common measure of the two space frequencies.

It is to be understood that although the strip filters above exemplified have strips of equal width, the strips may have various widthes, if desired.

It is apparent from the foregoing description that the color image pick-up system according to the invention has the following features:

(1) An image signal produced in the system contains a luminance component having a sufficiently large intensity and a relatively narrow frequency spectrum.
(2) The system can produce a luminance signal having an intensity in dependence on the intensities of color components in the image signal.
(3) The system can produce an image signal including chrominance components with sufficiently large frequency range although the luminance component of the image signal has a sufficiently large intensity.
(4) The system can produce an image signal including chrominance components with a uniform intensity.
(5) The system makes unnecessitated the registration and the dichroic mirrors necessitated in a multi-tube system, so that a camera tube of the system is simple in construction.

While there have been described what at present are considered to be the preferred embodiments of the invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A color television system comprising, in combination:
   (a) a color television camera tube including an evacuated envelope having a faceplate at one end, an electron gun at the other end of said envelope, a color filter element disposed on said faceplate and a photoelectrical element disposed inwardly of said color filter element, means for scanning electrons from said electron gun in a given direction, said color filter element comprising in combination therewith;
      a plurality of transparent or white strips extending in a direction normal to said given direction to produce from said photoelectrical element upon scanning of said electrons a luminance signal; and
      color strips of first and second colors arranged in alternating succession with said transparent or white strips and in recurrent groups to thereby produce two color signals from said photoelectrical element upon scanning of said electrons thereacross; and
   (b) an output impedance connected to said color camera tube; and
   (c) signal processing circuit means, including color encoding means, coupled to said output impedance and responsive to an image signal appearing thereacross for developing a composite color video signal therefrom, said signal processing circuit means including a first sampling pulse generating means for producing three sampling pulse trains each having respectively the same phase and frequency as one of said luminance signal and said two color signals, sampling means for sampling the image signal with said three sampling pulse trains so as to separate the luminance and the color signals from the image signal, and matrix and modulating means for converting the separated luminance and color signals into said composite color video signal, said modulating and matrix means comprising said color encoding means, and wherein said sampling pulse generating means includes a differentiator for differentiating the image signal, a cut-off and limiting circuit for cutting off negative portions of the differentiated image signal and for amplifying and limiting the differentiated and cut-off image signal so as to convert the differentiated and cut-off image signal into a reference pulse signal, a first sampling pulse generator for repeatedly producing a first sampling pulse at each of trailing edges of pulses of said reference pulse signal, a second sampling pulse generator for repeatedly producing a second sampling pulse at each of leading edges of alternate pulses of said pulse signal, and a third sampling pulse generator for repeatedly producing a third sampling pulse at each of leading edges of the remaining pulses of said pulse signal alternate with said alternate pulses.

2. A color television system according to claim 1, in which said cut-off and limiting circuit is a Schmidt circuit.

3. A color television system according to claim 1, in which said sampling means includes a first sampling gate for sampling said image signal with said first sampling pulse so as to separate said luminance signal from the image signal, a second sampling gate for sampling said image signal with said second sampling pulse so as to separate one of said color signals, and a third sampling gate for sampling said image signal with said third sampling pulse so as to separate the other of said color signals from said image signal.

4. A color television system according to claim 1, in which said matrix and modulating circuit includes a matrix circuit for converting said three components into the Y, Q and I signals, and a modulator for modulating said Y, Q and I signals into the composite color video signal.

5. A color television system according to claim 1, which further comprises a clamp circuit for clamping said image signal to a predetermined level.

6. A color television system comprising, in combination:
   (a) a color television camera tube including an evacuated envelope having a faceplate at one end, an electron gun at the other end of said envelope, a color filter element disposed on said faceplate and a photoelectrical element disposed inwardly of said color filter element, means for scanning electrons from said electron gun in a given direction, said color filter element comprising in combination therewith;
      a plurality of transparent or white strips extending in a direction normal to said given direction to produce from said photoelectrical element upon scanning of said electrons a luminance signal; and
      color strips of first and second colors arranged in alternating succession with said transparent or white strips and in recurrent groups to thereby produce two color signals from said photoelectrical element upon scanning of said electrons thereacross; and
   (b) an output impedance connected to said color camera tube; and
   (c) signal processing circuit means, including color encoding means, coupled to said output impedance and responsive to an image signal appearing thereacross for developing a composite color video signal therefrom, said signal processing circuit means including a first sampling pulse generating means for producing three sampling pulse trains each having respectively the same phase and frequency as one of said luminance signal and said two color signals, sampling means for sampling the image signal with said three sampling pulse trains so as to separate the luminance and the color signals from the image signal, and matrix and modulating means for converting the separated luminance and color signals into said composite color video signal, said modulating and matrix means comprising said color encoding means; and in which said signal processing circuit means further includes a correcting circuit which includes a first holding circuit for holding successive two pulses of said luminance signal, a second holding circuit for holding successive two pulses of said color signals neighboring said successive two pulses of the luminance signal, a first adder for adding said successive two pulses of the color signals, a second adder for adding said successive two pulses of the luminance signal, a first attenuator for attenuating the added successive two pulses of the luminance signal, a second attenuator for attenuating the added successive two pulses of the color signals, a first subtractor for subtracting the attenuated added successive two pulses of the color signals from the former one of said successive two pulses of the luminance signal, a second subtractor for subtracting the attenuated added successive two pulses of the luminance signal from one pulse of the successive two pulses of the color signals, a third subtractor for subtracting the attenuated added successive two pulses of the luminance signal from the other pulse of the successive two pulses of the color signals and first, second and third amplifiers for respectively amplifying the subtractions from said first, second and third subtractors.

* * * * *